(12) United States Patent
Dattaguru

(10) Patent No.: US 8,161,609 B2
(45) Date of Patent: Apr. 24, 2012

(54) METHODS OF FABRICATING AN ARRAY CAPACITOR

(75) Inventor: Sriram Dattaguru, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 12/124,817

(22) Filed: May 21, 2008

(65) Prior Publication Data

US 2009/0288279 A1    Nov. 26, 2009

(51) Int. Cl.
*H01G 4/28*    (2006.01)
(52) U.S. Cl. ............... 29/25.42; 29/25.03; 29/25.41; 361/303; 361/321.6
(58) Field of Classification Search ............ 29/25.03, 29/25.35, 25.41–25.42; 361/306.3, 763, 361/794, 321.3, 321.6; 174/255–264
See application file for complete search history.

(56) References Cited

U.S. PATENT DOCUMENTS

| | | | |
|---|---|---|---|
| 3,770,529 A * | 11/1973 | Anderson | 164/10 |
| 5,599,413 A * | 2/1997 | Nakao et al. | 156/89.12 |
| 6,370,010 B1 * | 4/2002 | Kuroda et al. | 361/306.1 |
| 6,407,907 B1 * | 6/2002 | Ahiko et al. | 361/306.3 |
| 6,753,218 B2 * | 6/2004 | Devoe et al. | 438/240 |
| 7,263,764 B2 * | 9/2007 | Heistand et al. | 29/610.1 |
| 7,499,258 B2 * | 3/2009 | Shim et al. | 361/307 |
| 7,580,240 B2 * | 8/2009 | Yamamoto et al. | 361/311 |
| 2006/0198079 A1 * | 9/2006 | Shim et al. | 361/306.3 |

* cited by examiner

*Primary Examiner* — Minh Trinh
(74) *Attorney, Agent, or Firm* — Winkle, PLLC

(57) ABSTRACT

Methods of fabricating an array capacitor are disclosed, in which via structures of the array capacitor have increased uniformity in their transverse areas. One method involves perforating a capacitor body to form first holes extending from a first surface and partially through the capacitor body. The capacitor body may be further perforated to form second holes extending from a second opposed surface of the capacitor body. The second holes are to connect to the first holes to provide through holes extending across a thickness of the capacitor body. An appropriate conductive material may then be filled in the through holes to form via structures with increased uniformity in their transverse areas.

6 Claims, 4 Drawing Sheets

METHODS OF FABRICATING AN ARRAY CAPACITOR

BACKGROUND

1. Technical Field

Embodiments of the invention relate to array capacitors for electronic packages, and more particularly to methods of fabricating an array capacitor.

2. Description of Related Art

Fabrication of thick array capacitors, e.g. having a thickness of about 1000 μm and above, has been fraught with difficulties. One reason is the high propensity to form tapered via holes due to limitations of current hole-drilling methods. Other disadvantages of having tapered vias, and voids in the via structures include increased mechanical stress to the via structures and undesirable variations in Equivalent Series Resistance and Equivalent Series Inductance of an array capacitor. Due to tapering of the via holes, voids are formed upon filling the via holes. These voids are undesirable as they constrict electrical current flow and thereby increase electrical resistance of the via structures.

Several fabrication methods have been devised in attempts to overcome the above problems associated with having tapered via structures, but have been unsatisfactory. One method of fabricating array capacitors having a thickness of about 1000 μm involves fabricating two blocks of array capacitors before the capacitor blocks are aligned and laminated together to form an array capacitor of increased thickness. More particularly, blocks of array capacitors, with about half the final required thickness, are subject to laser drilling to form via holes extending through the blocks. An appropriate fill material is then filled or plugged in the via holes to form the via structures. The blocks, together with the via structures, are then aligned and laminated together to form a combined array capacitor having increased thickness. There are, however, several drawbacks with this method. For example, aligning the capacitor blocks is time-consuming and yet imprecise, resulting in misalignment of the via structures at the adjoining surfaces. The combined array capacitor is also prone to delamination at the adjoining surfaces of the capacitor blocks. Further, overall capacitance density of the combined array capacitor is reduced as compared to another array capacitor of similar thickness but being formed from a single block. The reduction in overall capacitance density is due to loss of active electrode layers near the adjoining surfaces. Yet further, due to misalignment of the via holes, voids may be formed during filling of the via holes. These voids are undesirable as they constrict flow of electrical current and thereby increase electrical resistance of the via structures.

DETAILED DESCRIPTION OF ILLUSTRATIVE EMBODIMENTS

Figure 1:
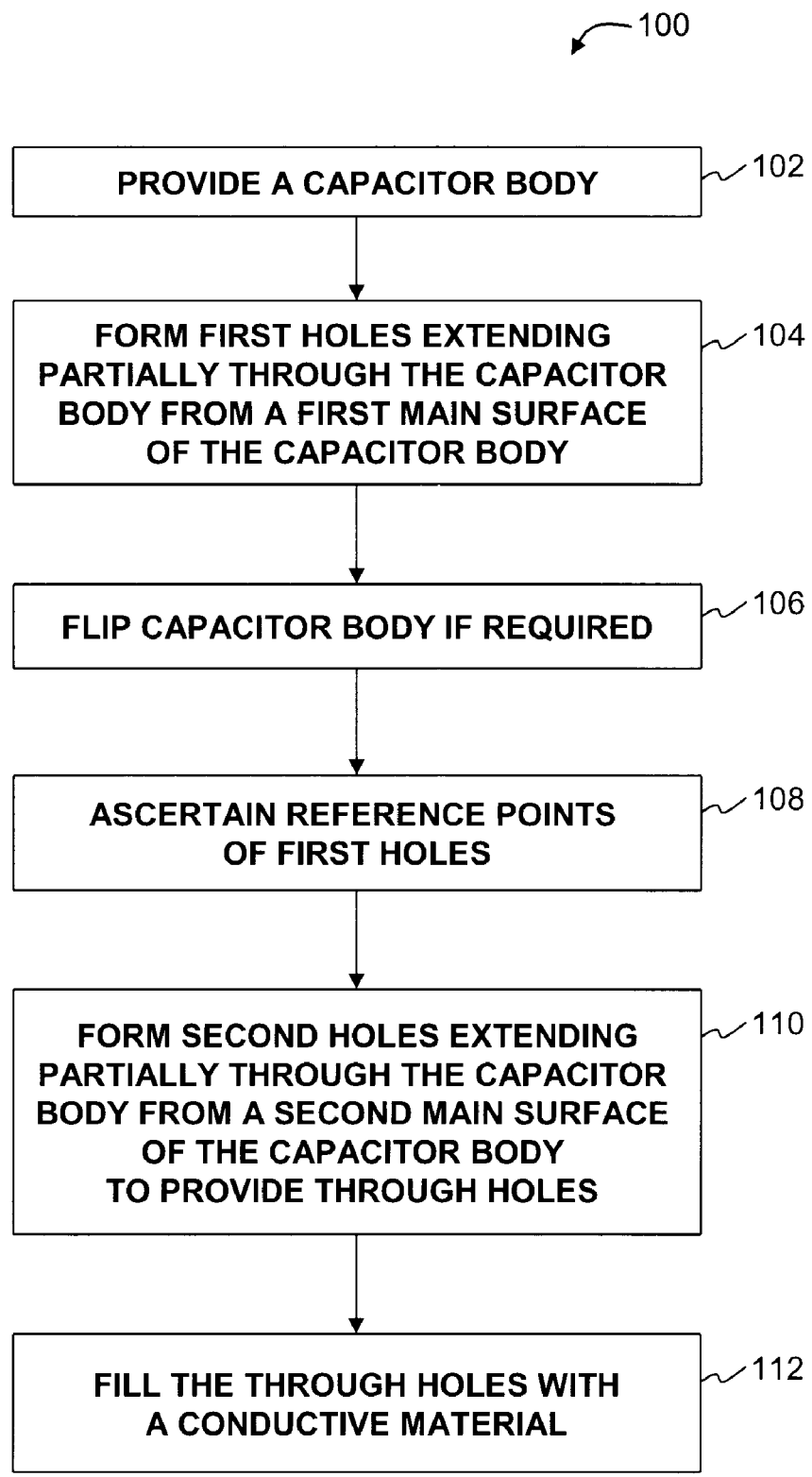
FIG. 1 is a process sequence of fabricating an array capacitor according to one embodiment of the invention.

In the following description, numerous specific details are set forth in order to provide a thorough understanding of various illustrative embodiments of the present invention. It will be understood, however, to one skilled in the art, that embodiments of the present invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

FIG. 1 is a flow chart summarizing a sequence 100 of fabricating an array capacitor according to one embodiment of the invention. The process sequence 100 will be described with further reference to FIGS. 2A to 2D illustrating various process outputs obtained during the process sequence 100 of FIG. 1.

The process sequence 100 begins with providing a capacitor body 201 (block 102). The capacitor body 201 may be formed of multiple dielectric 202 and conductive layers 204 stacked upon one another and alternately arranged in an interleaved arrangement. More particularly, the conductive layers 204 may be patterned and separated from each other by a dielectric layer 202 so that adjacent conductive layers 204 form a parallel plate capacitor. Accordingly, with the presence of multiple conductive 204 and dielectric layers 202, a capacitor body 201 may include several parallel plate capacitors. The conductive layers 204 may be selectively electrically connected to one another through conductive via structures 206 extending from a first main surface 208 (top surface) to a second main surface 210 (bottom surface) of the capacitor body 201. Depending on requirements, the via structures 206 may connect some or all of the conductive layers 204. Various combinations of materials may be used for the conductive layers 204, dielectric layers 202 and via structures 206. In one embodiment, the dielectric layers 202 contain barium titanate ($BaTiO_3$) while the conductive layers 204 and the via fill material contain nickel with minor additions of barium titanate which help to match the shrinkage of the dielectric layers 202.

The capacitor body 201, when in the form of stacked green sheets, may have a thickness about 15% higher than the desired thickness of a completed array capacitor after firing. Since embodiments of the invention are suitable for fabricating thick array capacitors, the capacitor body 201, in a completed array capacitor after firing, may have a thickness of at least about 1000 μm (i.e. vertical height between the first 208 and the second main surfaces 210). However, it is to be appreciated that embodiments of the invention are equally suitable for fabricating array capacitors having a thickness less than about 1000 μm.

Figure 2A:
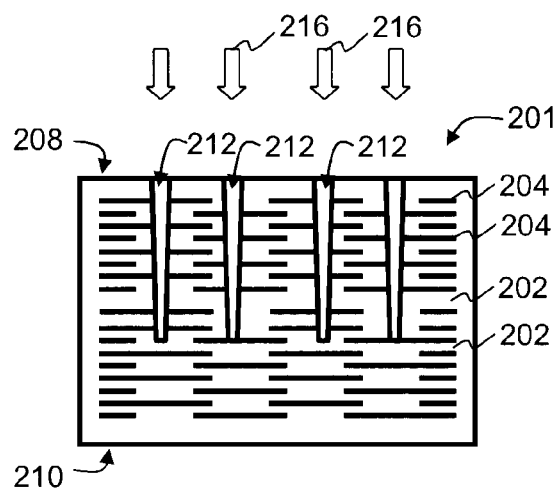
FIGS. 2A to 2D illustrate various process outputs obtained during the process sequence of FIG. 1.

The process sequence 100 may then proceed with forming via holes in the capacitor body 201 by laser drilling, mechanical drilling, or other known methods. More particularly, the capacitor body 201 may be perforated to form a plurality of first holes 212 extending partially through the capacitor body 201 from the first main surface 208 (block 104). The depth of the first holes 212 may be more than or less than half the thickness of the capacitor body 201. FIG. 2A illustrates a capacitor body 201 having a first plurality of holes extending partially through the capacitor body 201.

Figure 2B:
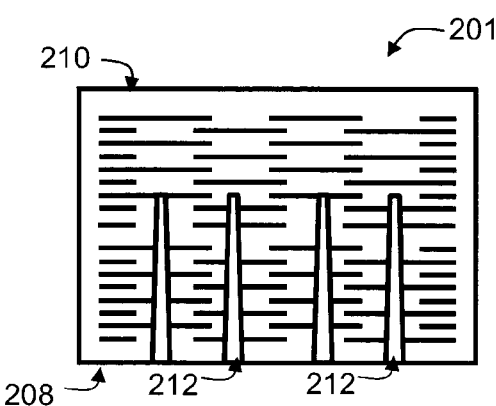

After forming the first holes 212, the capacitor body 201 may be flipped (block 106), if required, in preparation for forming at least a plurality of second holes extending from the second main surface 210 of the capacitor body 201. FIG. 2B illustrates the capacitor body 201 of FIG. 2A having been flipped about 180 degrees. Flipping of the capacitor body 201 may be required if the laser drilling apparatus or source 216 for forming the first and second holes 214 is arranged to operate from a same direction. If, however, the laser drilling apparatus is arranged to drill from opposing directions, flipping of the capacitor body 201 in preparation for forming the second holes would not be required.

Further, in preparation for forming the second holes, superimposed positions of the first holes on the second main surface 210 of the capacitor body 201 may be ascertained (block 108). To this purpose, a vision alignment system may be used to determine one or more reference points (e.g. perimeter, center point) of the first holes on the second main surface 210 and to indicate or mark the reference point(s) on the second main surface 210.

Based on the reference point ascertained this way and the markings of the reference point on the second main surface 210, the capacitor body 201 is perforated to form a plurality of second holes 214 extending partially through the capacitor body 201 from the second main surface 210 (block 110). The second holes 214 are disposed in fluid communication with the first holes 212 to provide through via holes extending across a thickness of the capacitor body 201.

Depending on the thickness of the capacitor body 201, the first holes 212 may have tapered ends which are disposed remote from the drilling apparatus or source 216. With the forming of the second holes 214 to provide through via holes, the tapered ends of the first holes 212 are expanded, to increase uniformity of the transverse areas throughout the depth of the through via holes. In certain embodiments, depending on the thickness of the capacitor body 201 and choice of drilling apparatus, uniformity of the transverse areas may be increased such that the transverse areas are substantially uniform throughout the depth of the through via holes.

Figure 2C:
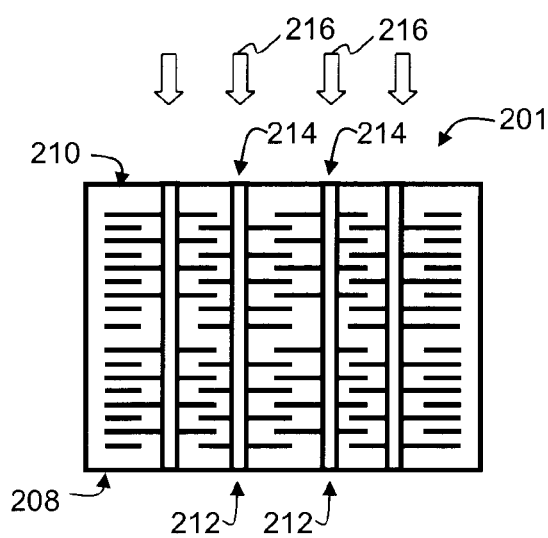

Due to limitations of the drilling methods or apparatus, there may be slight variations in the transverse areas of the through via holes in the range of at most about 10% or about ±15 μm with the present state of art laser drilling apparatus. As variations up to about 10% in the transverse area of the through via holes are within tolerable range, the variations would not result in undue adverse effects to the performance of the completed array capacitor. FIG. 2C illustrates the capacitor body 201 of FIG. 2A having at least a second hole formed in fluid communication with the first hole.

Figure 2D:
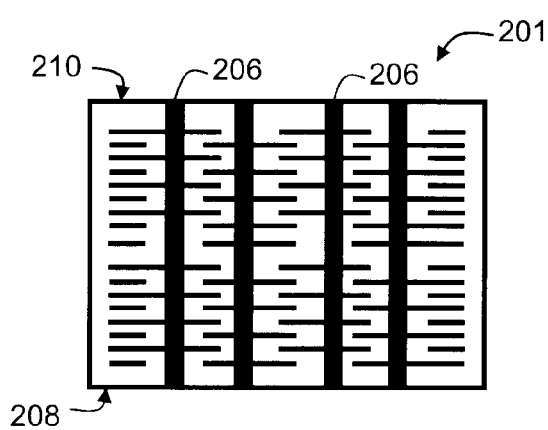

The process sequence 100 may then proceed with filling or plugging the through via holes with a suitable electrically conductive material to form conductive via structures 206 (block 112). Suitable electrically conductive materials include nickel, or copper. One method of filling the through holes involves screen printing the conductive materials onto one of the main surfaces of the capacitor body 201 and drawing the conductive materials into the through via holes by capillary action and/or a suction apparatus arranged on an opposed surface of the capacitor body 201. The main surfaces of the capacitor body 201 may be subsequently flattened or grinded to remove blots of conductive materials remaining on the surface to eliminate surface undulations. FIG. 2D illustrates a capacitor body 201 having via structures 206 formed therein. In one embodiment, the capacitor body 201 of FIG. 2D may be singulated into several units, by a laser saw, mechanical saw or other known singulation methods, for forming several array capacitors. In another embodiment, the capacitor body 201 of FIG. 2D may form a single array capacitor.

Figure 3:
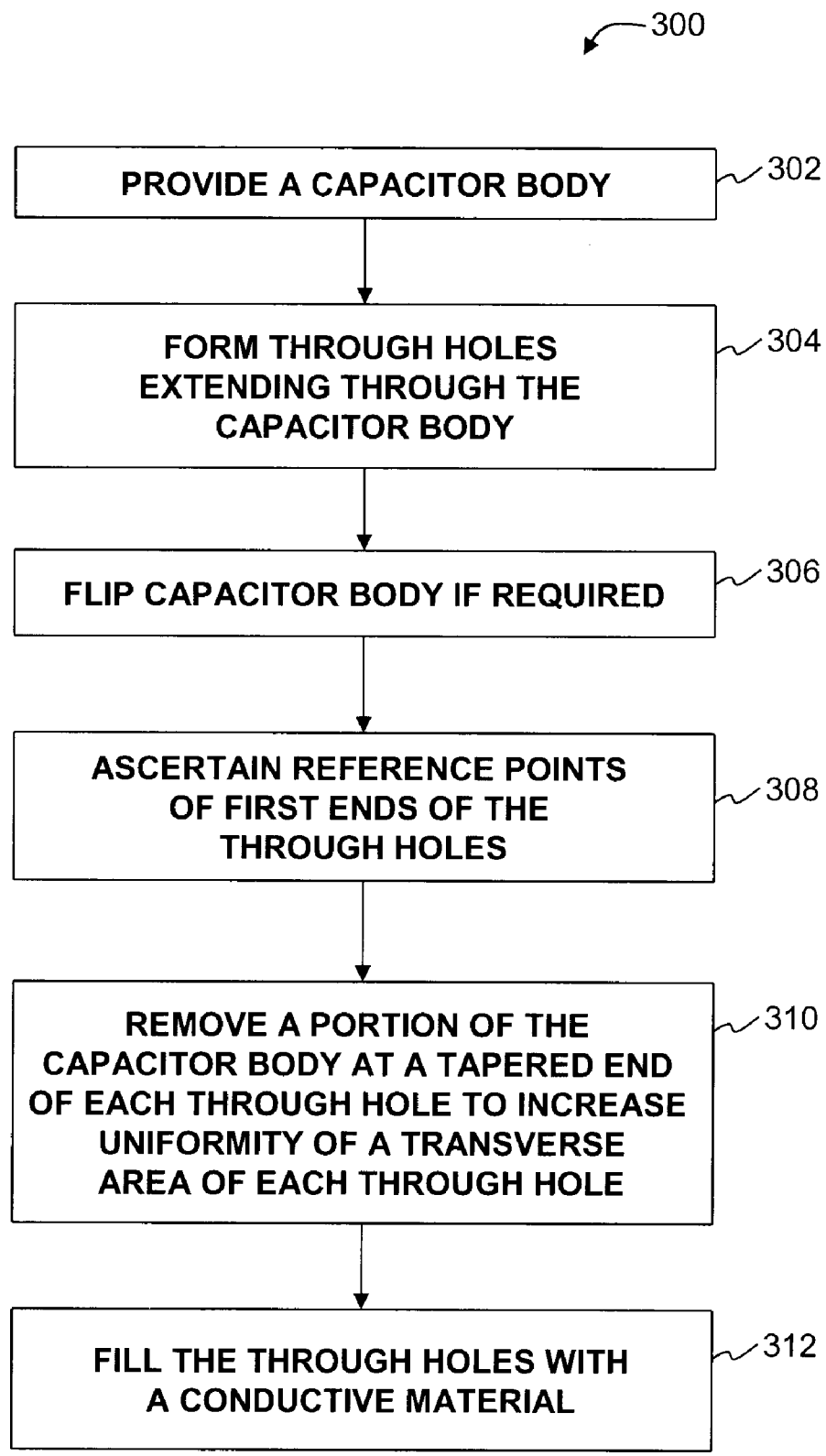
FIG. 3 is a process sequence of fabricating an array capacitor according to another embodiment of the invention.

FIG. 3 is a flow chart summarizing a sequence 300 of fabricating an array capacitor according to another embodiment of the invention. Certain steps in the sequence 300 of FIG. 3 are similar to that in the process sequence 100 of FIG. 1 and thus will not be elaborated further.

The process sequence 300 begins with providing a capacitor body 201 (block 302), similar to the process sequence 100 of FIG. 1.

The process sequence 300 may then proceed with forming via holes in the capacitor body 201, by laser drilling or other known methods. More particularly, the capacitor body 201 may be perforated to form a plurality of through via holes extending through the capacitor body 201 and connecting a first and an opposed second main surface 210 of the capacitor body 201 (block 304). In a thick capacitor body 201, e.g. thickness of about 1000 μm and above, a through hole extending across the capacitor body 201 is likely to have tapered ends which are disposed remote from the drilling apparatus or source 216.

After forming the through via holes, the capacitor body 201 may be flipped (block 306), if required, depending on where a drilling apparatus is arranged relative to the capacitor body 201.

Due to tapering, first ends of the through via holes, which were disposed more proximate to the drilling apparatus or source 216 would have larger transverse areas than opposed second (tapered) ends. The larger transverse areas at the first ends would be about the desired size of the through via holes. The process sequence 300 may then proceed with ascertaining superimposed positions of the first ends of the through via holes on the second main surface 210 of the capacitor body 201 (block 308). To this purpose, a vision alignment system may be used to determine one or more reference points (e.g. perimeter, center point) of the openings at the first ends of the through via holes and to indicate or mark the reference point(s) on the second main surface 210 of the capacitor body 201.

Based on the reference point(s) ascertained this way and the markings of the reference point(s) on the second main surface 210, a portion of the capacitor body 201 at a tapered end of each through hole is removed to increase uniformity of a transverse area of each through hole (block 310). More particularly, a portion of the capacitor body 201 proximate the second (tapered) end of each through holes, i.e., where the transverse area is smaller, is removed. This may be performed by disposing a laser drilling apparatus source 216 proximate to the second main surface 210 of the capacitor body 201. The tapered second ends of the through via holes are thus expanded to increase uniformity of the transverse areas throughout the depth of the through via holes. In certain embodiments, depending on the thickness of the capacitor body 201 and choice of drilling apparatus, uniformity of the transverse areas may be increased such that they are substantially uniform throughout the depth of the through via holes.

Due to limitations of the drilling methods or apparatus, there may be slight deviations in the transverse area of the through via holes in the range of at most about 10% or about ±7 μm. As variations in the transverse areas of the through holes within tolerable range, the variations would not result in undue adverse effects to the performance of the completed array capacitor.

The process sequence 300 may then proceed with filling or plugging the through via holes with a suitable electrically conductive material to form conductive via structures 206 (block 312), similar to that in process sequence 100. Subsequently, the main surfaces of the capacitor body 201 may be flatten or grinded to remove blots of conductive materials remaining on the surface to eliminate surface undulations. In one embodiment, the capacitor body 201 may be singulated into several units by a laser saw, mechanical saw or other singulation methods, for forming several array capacitors. In another embodiment, the capacitor body 201 may form a single array capacitor.

Figure 4:
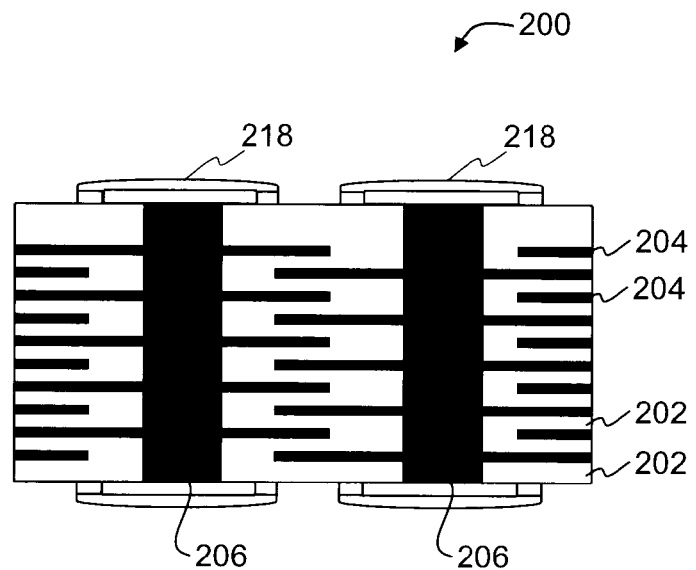
FIG. 4 illustrates an array capacitor obtained according to one embodiment of the invention.

The capacitor body 201 obtained from the above process sequences 100, 300 may be further processed. For example, contact terminals 218, e.g. copper plating, may be provided at the terminations of the via structures 206 on both main surfaces of the capacitor body 201. FIG. 4 illustrates an array capacitor 200 obtained according to one embodiment of the invention. The array capacitor 200 of FIG. 4 may be used as discrete devices or as embedded devices in a semiconductor package.

Figure 5:
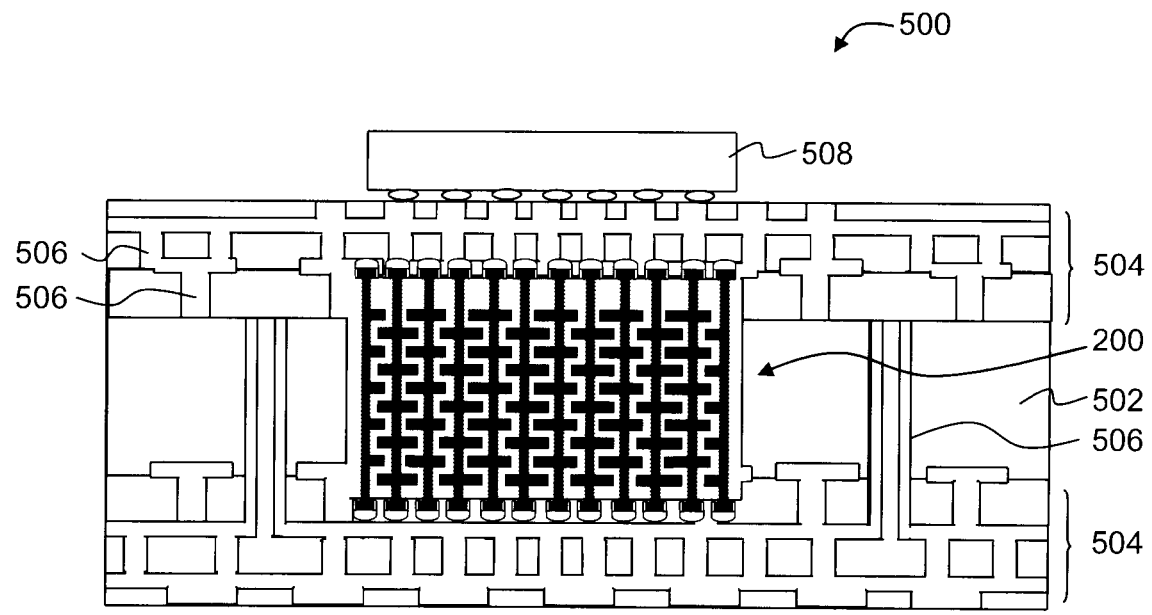
FIG. 5 illustrates an array capacitor embedded in a CPU package according to one embodiment of the invention.

FIG. 5 illustrates an array capacitor 200 embedded in a Central Processing Unit (CPU) package 500 according to one embodiment of the invention. More particularly, the array capacitor 200 is embedded in an organic substrate 502. Stacked layers 504 comprising of conductive materials and dielectric materials arranged in an alternating manner may be formed upon the organic substrate 502. The conductive materials may be selectively patterned to form appropriate circuits. Layers of the conductive materials may be electrically coupled to one another by via structures 506. An integrated circuit semiconductor die, e.g. a CPU die 508, is mounted on the organic substrate 502 using joining members, e.g. solder bumps, and electrically coupled to the array capacitor 200 through the conductive layers and via structures 506 arranged therebetween. Other components, e.g. underfill material between the die and the substrate, interconnects between the substrate and external circuits or printed circuit boards, may also be provided as required.

Embodiments of the invention achieve increased uniformity of the via holes allows greater ease of filling or plugging conductive materials to form via structures as compared to filling tapered via holes. With the increased uniformity in transverse areas of the via holes, the risk of having via voids in the via structures is reduced, thereby increasing the quality of the via structures and hence capacitor performance. As compared to prior methods where multiple capacitor blocks are combined, with the assistance of ceramic bridges interposed therebetween, to form a thick array capacitor, embodiments of the invention eliminates the need for ceramic bridges and thereby improving capacitance density of the resulting array capacitor to about 25%.

In applications such as server modules and high end packaging modules, thick array capacitors, e.g. about 1000 μm and above, may be used. The thick array capacitors are embedded in a package substrate to be disposed as close as possible to the semiconductor die so that the overall loop inductance of the package is reduced. With embodiments of the invention, improved capacitor performance may be achieved without unduly increase the thickness of an organic package.

Other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

What is claimed is:

1. A method of fabricating an array capacitor, comprising:
providing a capacitor body having an interleaved arrangement formed of a plurality of dielectric layers and electrode layers, the capacitor body having a first main surface and an opposed second main surface;
perforating the capacitor body to form a plurality of first holes extending from the first main surface at least partially through the capacitor body;
flipping the capacitor body;
perforating the flipped capacitor body to form a plurality of second holes extending from the second main surface, wherein the second holes are disposed in fluid communication with the first holes to provide through holes having transverse areas with increased uniformity; and
providing an electrically conductive material in the through holes.

2. The method of claim 1, further comprising: prior to perforating the capacitor to form second holes, ascertaining at least a reference point of the first holes on the second main surface of the capacitor body.

3. The method of claim 1, wherein perforating the capacitor body is by laser drilling.

4. The method of claim 1, further comprising embedding the capacitor body in a package substrate to dispose the capacitor body in proximity with a semiconductor die.

5. The method of claim 1, wherein a thickness of the capacitor body between the first and the second main surfaces is at least about 1000 μm.

6. The method of claim 1, wherein the transverse areas vary by at most about 10%.

* * * * *